United States Patent
Schauer et al.

(12)

(10) Patent No.: US 6,686,046 B2
(45) Date of Patent: Feb. 3, 2004

(54) METHOD OF COATING SUBSTRATE SURFACES WITH LCST POLYMERS

(75) Inventors: Thadeus Schauer, Neuhengstett (DE); Marc Entenmann, Fellbach (DE); Claus D. Eisenbach, Sindelfingen (DE)

(73) Assignee: Forschungsinstitut fur Pigmente und Lacke e.V., Stuttgart (DE)

( * ) Notice: Subject to any disclaimer, the term of this patent is extended or adjusted under 35 U.S.C. 154(b) by 0 days.

(21) Appl. No.: 10/219,911

(22) Filed: Aug. 15, 2002

(65) Prior Publication Data

US 2003/0012954 A1 Jan. 16, 2003

Related U.S. Application Data

(63) Continuation of application No. PCT/EP01/01670, filed on Feb. 15, 2001.

(30) Foreign Application Priority Data

Feb. 15, 2000 (DE) ........................................ 100 06 538

(51) Int. Cl.$^7$ ................................................. B32B 5/16
(52) U.S. Cl. .................. 428/403; 427/212; 427/213.31; 427/213.33; 427/215; 427/222; 427/385.5; 427/388.1; 427/388.2; 427/389.7; 427/389.9; 428/407
(58) Field of Search ................................ 428/403, 407; 427/212, 213.31, 213.33, 215, 222, 385.5, 388.1, 388.2, 389.7, 389.9

(56) References Cited

U.S. PATENT DOCUMENTS

| | | | | |
|---|---|---|---|---|
| 5,460,817 A | * | 10/1995 | Langley et al. | 424/408 |
| 5,492,646 A | * | 2/1996 | Langley et al. | |
| 5,652,316 A | | 7/1997 | May et al. | |
| 6,133,047 A | | 10/2000 | Elaissari et al. | |
| 6,270,903 B1 | * | 8/2001 | Feng et al. | 428/429 |
| 6,290,988 B1 | * | 9/2001 | Van Vilsteren et al. | |

FOREIGN PATENT DOCUMENTS

| | | | |
|---|---|---|---|
| EP | | 0629649 A1 | 12/1994 |
| EP | | 0718327 A2 | 6/1996 |
| WO | WO 87/06152 A1 | | 10/1987 |
| WO | WO 92/20441 A1 | | 11/1992 |
| WO | WO 97/45202 A1 | | 12/1997 |

OTHER PUBLICATIONS

Patent Abstracts of Japan, vol. 009, No. 188 (C–295) (Apr. 4, 1985) (JP 60–058237 A abstract).
Elias, "Polymers, From Monomer and Macromolecules to Raw Materials", Section 5.1.5, pp 183–184, Hüthig & Wepf, Hüthig GmbH (1996).
Fujiki et al., "Radical Grafting from Carbon Black. Graft Polymerization of Vinyl Monomers Initiated by Azo Groups Introduced onto Carbon Black Surface", *Polymer Journal*, pp 661–670, vol. 22, No. 8, (1990).
Ihara et al., "Surface Modification of Pigments with temperature–Responsive Polymer Grafted by Plasma–Induced Polymerization", *Journal of Photopolymer Science and Technology*, pp 315–320, vol. 11, No. 2 (1998).
O'Brien et al., "Electroacoustic Determination of Particle Size and Zeta Potential", *Journal of Colloid and Interface Science,* 173, 406–418, (1995).
Park et al., Permeation Control through Porous Membranes Immobilized with Thermosensitive Polymer, *Langmuir* [Online] 1998. 14, 910–914.
Sato et al., "UCST and LCST behaviour in polymer blends containing poly (methyl methacrylate–stat–styrene)", *POLYMER,* pp. 773–780, vol 39, No. 4, (1998).
Suwa et al., "Effects of salt on the temperature and pressure responsive properties of poly (N–vinylisobutyramide) aqueous solutions", *Colloid Polymer Sceience,* pp 529–533, vol. 276, No. 6, (1998).
Tsubokawa et al., "Grafting of Polymers onto Carbon Black Surface by Trapping of Polymer Radicals Formed by Redox Reaction", *J. Jpn. Soc. Colour Mater,* pp 475–481, vol 72, No. 8, Japan, (1999).

* cited by examiner

*Primary Examiner*—H. Thi Le
(74) *Attorney, Agent, or Firm*—Leydig, Voit & Mayer, Ltd.

(57) ABSTRACT

In order to make it possible to treat particles in such a manner that they are stabilized as disperse particles in liquid media, such as varnishes, a method of coating particles with LCST polymers is proposed which is characterized by the following steps: a) dissolution of an LCST polymers in a solvent at a temperature below the LCST; b) mixing the solution obtained in step a) with the particles to be coated; and c) increasing the temperature of the mixture obtained in step b) to or beyond the point at which the LCST polymer deposits onto the particle surfaces.

35 Claims, 2 Drawing Sheets

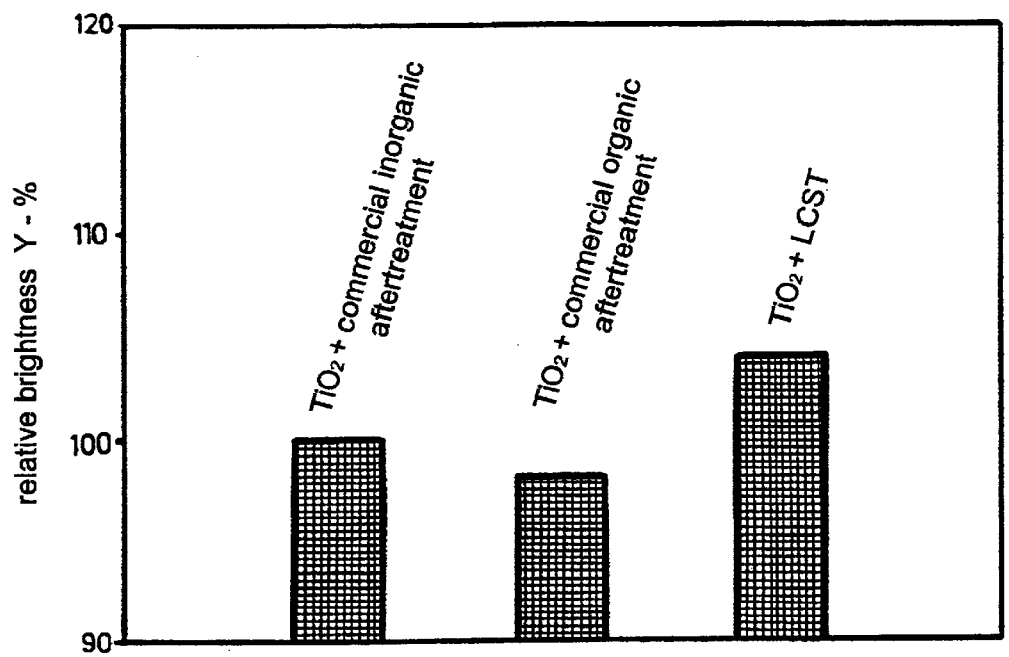
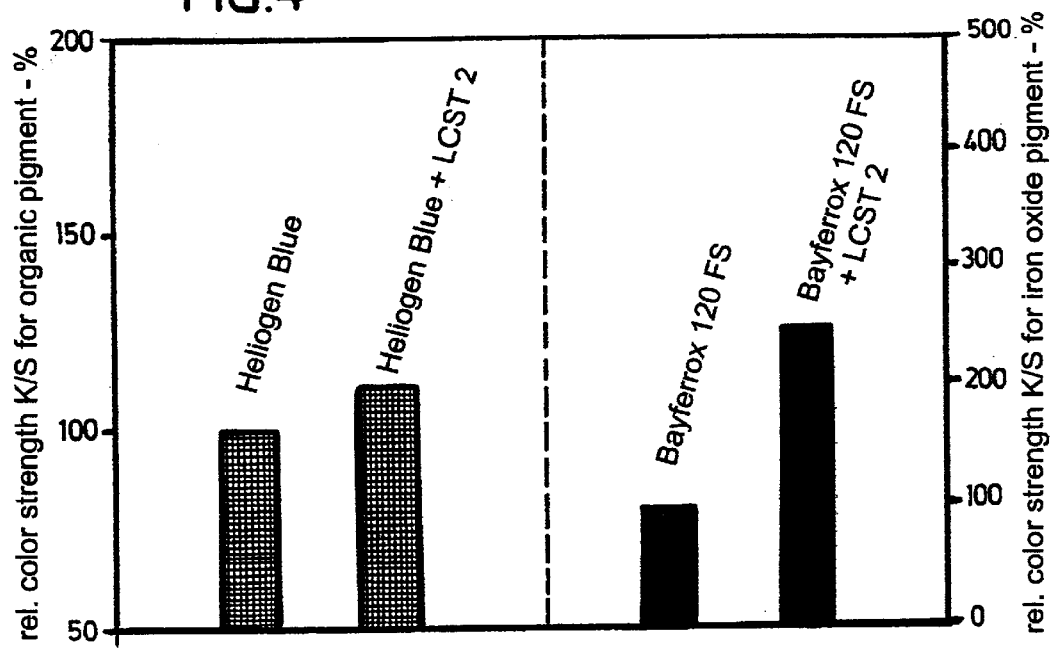

METHOD OF COATING SUBSTRATE SURFACES WITH LCST POLYMERS

This patent application is a continuation of International Patent Application PCT/EP01/01670, filed Feb. 15, 2001, herein incorporated by reference in its entirety for all purposes, which relates to the subject matter disclosed in German application No. 100 06 538.4 of Feb. 15, 2000, which is incorporated herein by reference in its entirety and for all purposes.

BACKGROUND OF THE INVENTION

The invention relates to a method of coating substrate surfaces with LCST polymers, in particular to a method of coating pigment particles and, very particularly, to a method of irreversibly coating particulate and non-particulate substrate surfaces in general.

LCST polymers are polymers which are soluble in a solvent at low temperatures and separate from the solution as a separate phase when the temperature is raised and the LCST (lower critical solution temperature) is reached.

A definition thereof is given, in particular, in the monograph "Polymere" by Hans-Georg Elias, Hüthig and Wepf-Verlag, Zug, 1996, pages 183 to 184.

Pigments are finely divided particulate materials which, when mixed with a vehicle or matrix, influence or determine the coloration thereof. For reasons of cost, pigments are used in minimum amounts. Due to interaction forces, agglomeration can take place, particularly when the pigment particles are worked into the vehicle or matrix, so that the number of particles available for imparting color is reduced. Such agglomerate is broken down usually only with considerable difficulty or in at least a sluggish manner. When it is nevertheless desirable to achieve a desired shade within an acceptable time and with justifiable expenditure, the only alternative is to raise the amount of pigment added.

On the other hand, the pigment particles, particularly particles of inorganic pigments, are of a substantially higher density than the vehicle or matrix, which is usually of an organic nature, so that sedimentation effects are observed when the pigment dispersions stand for a time.

SUMMARY OF THE INVENTION

It is an object of the present invention to treat particles such that they are stabilized as disperse particles in liquid media, such as varnishes.

In the present invention, the particles are provided with a coating of LCST polymers, this being carried out by first dissolving an LCST polymer in a solvent at a temperature below the LCST, then mixing the particles with the resulting solution, and raising the temperature of the resulting mixture to, and optionally beyond, the point at which the LCST polymer deposits onto the particle surfaces.

LCST polymers are particularly suitable for enveloping particles entirely without influencing the color of the particles themselves, since LCST polymers are completely transparent in the visible range.

Astonishingly, it is not only possible to achieve stabilization of the particles in liquid media, such as varnishes or the like, but we have also found, surprisingly, that the coloring strength of the pigments is fully retained, because coating with LCST polymers inhibits agglomeration of the fine pigment particles.

As examples of particles that can be coated by the method of the invention there may be mentioned:

| | |
|---|---|
| pigments: | titanium dioxide, iron oxide, zinc oxide, carbon black, and copper phthalocyanine particles; |
| fillers: | barium sulfate, talcum, silicate, and barite particles; |
| nanoparticles: | iron oxide, titanium dioxide, and silicon dioxide particles; and |
| microfibers: | glass, carbon, textile, and polymer fibers. |

Furthermore, we have found that coating the particles with LCST polymer can improve the compatibility of the particles with the vehicle or matrix, ie the particles can be rendered compatible with aqueous media or organic media regardless of the nature of the particles.

We have also found, surprisingly, that coating the particles, particularly lamellar particles of fancy pigments, with LCST polymer provides an additional protection against mechanical damage under shear loads such as occur during extrusion.

The particles are added to the solution of LCST polymer preferably in the form of a dispersion, preferably using the same solvent as that of the LCST polymer solution, whilst the temperature of the dispersion is lowered to below the LCST.

It is particularly preferred to carry out said LCST polymer coating such that the coating completely envelops the (pigment) particles.

The layer thicknesses of the LCST polymer coatings are preferably ≧20 nm, more preferably ≧25 nm, and most preferably ≧50 nm.

A particularly homogeneous thick coating is obtained on surfaces when the material to be coated is first heated in admixture with the LCST polymer solution to a temperature above the LCST, and is then cooled and reheated, once or a number of times.

The coating process is very preferably carried out such that subsequently to or during formation of the coating the LCST polymer is rendered immobile on the surface of the substrates to be coated therewith.

Several processes are suitable for said immobilization, these being such as crosslink the coating or fix it to the substrate surface. This crosslinking or fixation can be accomplished by effecting suitable modification of the polymer and/or the substrate such that chemical bonds are formed between the individual polymer chains (crosslinking) and/or between the substrate and the LCST polymer. Examples of a suitable method of modifying the LCST polymers would be the introduction of a radically crosslinkable group or of acid chloride or chloroformate groups since this would make it possible to cause reaction with OH and NH groups in the polymer (crosslinking) or with OH and NH groups on the substrate surface (fixation).

Another way of immobilizing the LCST polymer layer is of a thermodynamic nature and consists in either modifying the LCST polymer with groups which interact strongly with the substrate (due to ionic, polar, or non-polar reciprocal effects) or in achieving as low an LCST of the polymer as possible.

The literature discloses reactions in which polymers are bound to surfaces by so-called grafting-from processes. These grafting-from reactions can be initiated by the introduction of certain groups on the surface. Depending on the modification of the surface, monomers are then polymerized onto the surface radically, cationically or anionically (cf: K. Fujiki, N. Tsubokawa, Y. Sone, Polym. J. 22).

However, the polymer may also be grafted onto the surface by free-radical polymerization (cf T. Tsubokawa, A. Naitoh, J. Jpn. Soc. Colour Mater. 72 (8) (1999) 475).

A drawback of this method is that the grafting-from process demands a functionalized surface, which is not the case with all substrates and cannot always be created.

Any functionalization of the surface additionally necessary denotes an additional process step, however.

Furthermore, the subsequent polyreaction must then be carried out in the presence of the substrates, which reaction in turn calls for very specific reaction conditions, such as temperature, solvent, etc., which frequently leads to at least partial flocculation of the substrate particles. Instead of a coating of individual substrate particles there are produced coated flocculates.

The advantage of the present process resides in the general possibility of modifying surfaces of very different types with polymer layers of variable thickness. By suitably choosing LCST polymers having good active groups and an LCST as low as possible, the polymer is thermodynamically immobilized on the substrate surface so that frequently no additional crosslinking or fixation is necessary.

When selecting the LCST polymers for said thermodynamic immobilization, care is taken to ensure that the LCST temperature is below the operating temperature of the coated substrate, for example room temperature, as far as possible, and that the difference between said operating temperature and the LCST is as great as possible, ie the temperature difference is preferably $\geq 10°$ C. and more preferably $\geq 15°$ C. The LCST is therefore preferably <15° C. and more preferably <10° C.

Particularly suitable substrates are, in addition to pigments, fillers for plastics materials and varnishes, which fillers exist in particle form and are required to be distributed in the end product as finely and uniformly as possible. Here again, this process is suitable for improving the properties of these fillers by keeping the filler particles discrete from each other so that no agglomeration takes place and, in addition, said fillers can be simultaneously rendered compatible with the plastics matrix or the varnish medium or vehicle.

The above process is also suitable for coating non-particulate substrate surfaces with LCST polymer, this being achieved as follows:

(a) an LCST polymer is dissolved in a solvent at a temperature below the LCST;

(b) the solution produced in step (a) is brought into contact with the substrate surface of the non-particulate substrate to be coated; and (c) the temperature is raised to or beyond the point at which deposition of LCST polymer onto the substrate surface occurs.

Another particularly important application of the present invention resides in coating semiconductor wafers as substrates with LCST polymers.

Certain areas or the whole area of the surface of said semiconductor wafer can be hydrophobized or hydrophilized with deposited LCST polymers.

Thus the process of the invention is also suitable for making masks on surfaces of semiconductor wafers by depositing LCST polymer of hydrophilic and/or hydrophobic nature onto the surface in a desired manner and immobilizing the same.

Thus the present invention relates not only to the process of the invention but also to pigments provided with a coating of an LCST polymer exhibiting the aforementioned advantages. In addition, the invention also relates to fillers exhibiting on their surface an LCST polymer coating and, in particular, semiconductor wafers having a surface coating of immobilized LCST polymer.

The pigments coated in the manner herein proposed can be used to produce binder-free pigment pastes containing a carrier medium, preferably water or an organic solvent, which by reason of their freedom from binding agents can be used universally in paints and varnishes. In this way there is no necessity to stock modified pigment pastes for paints and varnishes having different binder systems. Besides, the binder-free pigment pastes of the invention can be very simply incorporated in the accepting media (paints, varnishes, plastics materials, etc.), since by reason of the LCST coating agglomeration of the pigment particles is avoided and the mixing operation need not take this into consideration (no dispersion is necessary).

The LCST coating according to the present invention—whether on particulate or non-particulate substrates—can serve as a protective coating for underlying coatings containing UV stabilizers, chromophores, or luminescent components.

It is also conceivably to incorporate such functional components in the LCST coating itself or, alternatively, to link them chemically to the LCST polymers, and then to deposit them onto the substrate surface.

In addition to its protective function, coating with LCST polymers may also serve to modify the particle surface, over which further functionalization of the surface can be carried out.

Within the scope of the present invention particularly suitable LCST polymers are, for example:

polyethylene oxide (PEO) derivatives polypropylene oxide (PPO) derivatives poly(N-isopropylacrylamide)

ethyl(hydroxyethyl)cellulose poly(N-vinylcaprolactam) and poly(methylvinyl ether).

These and other advantages of the invention are illustrated in greater detail below with reference to examples and the drawings.

BRIEF DESCRIPTION OF THE DRAWINGS

FIG. 3 shows the stabilizing action of LCST polymers on pigments in accordance with the invention; and FIG. 4 illustrates the effect of LCST polymers on the coloring strength of pigments in accordance with the invention.

DETAILED DESCRIPTION OF THE INVENTION

Figure 1:
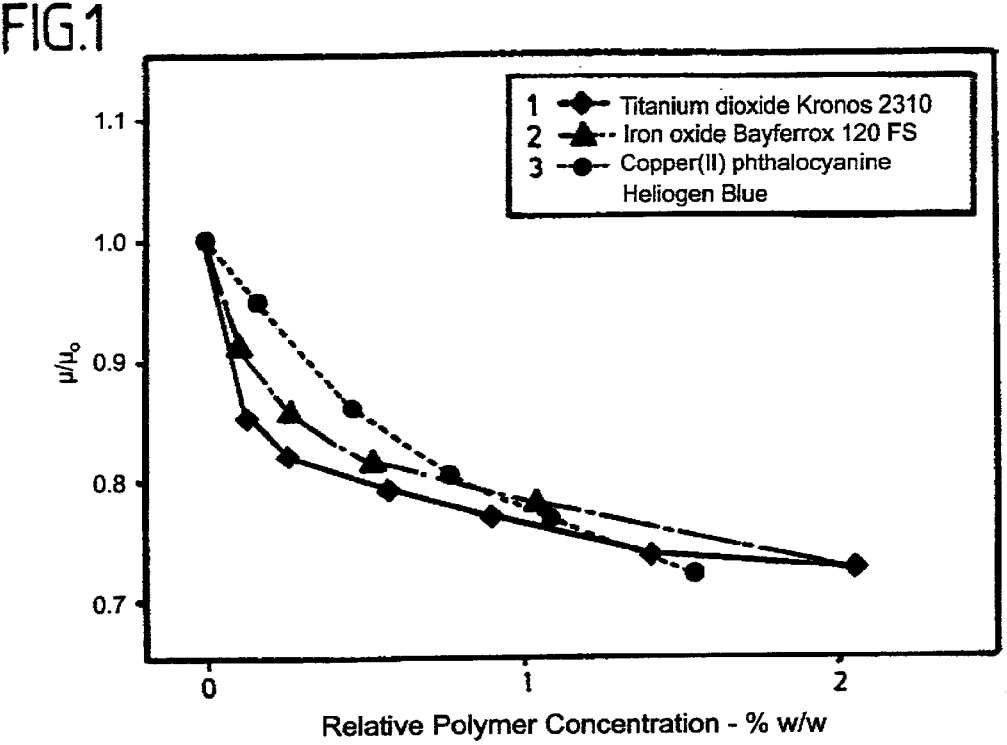
FIG. 1 shows quasi-adsorption isotherms for an LCST polymer on various pigments.

The following Examples 1 to 3 describe the procedure of coating with an LCST polymer in accordance with the present invention and illustrate the effects thereof on various pigments.

EXAMPLE 1

A PEO-PPO-PEO block copolymer having a molecular weight of 4,000 g/mol and an LCST of 8° C. (as sold by Aldrich) as LCST polymer is dissolved in distilled water at ca 5° C. to give a solution having a concentration of ca 10 wt %. This solution is kept at ca 1° C.

In a parallel setup, a 1 vol % strength dispersion of a titanium dioxide pigment (Kronos 2310, sold by Kronos International) is prepared, this being done by weighing 6.8 g of the pigment with 400 g of glass beads (diameter 3 mm) and 168 g of distilled water into a wide-mouth flask of polypropylene and dispersing the mixture for ca 30 min in a Scandex shaker. The dispersion (pigment in water) is sifted from the glass beads and stirring is continued with a magnetic stirrer. The pigment dispersion is kept at ca 1° C.

To the cooled pigment dispersion there is added, with continued agitation, the temperature-controlled polymer solution until the polymer content in the mixture is 5 wt %, based on the weighed amount of pigment.

The temperature is kept at 1° C. for a further 2 h, after which the dispersion is heated to room temperature (23° C.) and kept at this temperature for 15 min.

This procedure, ie cooling the mixture to 1° C. (over a period of 2 h) and heating to room temperature (15 min), is repeated four times. The pigment thus coated is filtered off at 1°C., rinsed with distilled water at room temperature, and then air-dried at room temperature.

Execution of ESA (electrokinetic sonic amplitude) measurements:

The ESA method is a relatively novel procedure for the characterization of particle surfaces (R. W. O'Brien, D. W. Camron, W. N. Rowlands, J. Colloid Interface Sci. 173 (1985), 406).

When a high-frequency electrical alternating field is applied to a dispersion of particles, the particles move along the lines of the outer electric field.

Due to the fact that a density difference exists between the aqueous medium and the particles, a sound wave is generated at the phase boundaries of the aqueous medium, which sound wave, however, shows a phase shift relatively to the excitation wave of the electric field. This phase shift together with the amplitude of the sound wave (ESA), is a direct function of the mobility $\mu$ of the particles, which dynamic mobility is in turn governed by the excitation frequency and the particle properties, such as the electrokinetic potential and particle size. Now when the dynamic mobility $\mu$ of a particle exhibiting an adsorbed polymer layer is divided by the mobility $\mu_0$ of the particle without the polymer coating, there is obtained a relative particle mobility $\mu/\mu_0$, which is a qualitative measure of the adsorbed polymer layer thickness.

Recording of quasi-adsorption isotherms for an LCST polymer on a titanium dioxide surface using the ESA method:

A 1 vol % strength titanium dioxide pigment dispersion is prepared as described above. The dispersion is kept at 23° C. with stirring. Now 400 g of the dispersion are weighed into the ESA measuring cell and the dispersion is set to pH 8.5 and a conductance of 500 $\mu$S/cm by adding a saturated potassium nitrate solution (23° C.) and a 1M KOH solution or a 1M nitric acid solution (likewise 23° C.). The dynamic mobility of the titanium dioxide particles without a polymer coating is then measured at 0.5 MHz excitation frequency. For the addition of LCST polymer below the LCST temperature the dispersion is placed in a temperature-controlled vessel and cooled to 2° C with stirring. 100 $\mu$l of LCST polymer solution (10 wt % strength) are added, and after 5 min the mixture is heated to 23 ° C. The suspension is transferred back to the ESA measuring cell and the dynamic mobility remeasured at 0.5 MHz.

The resulting relative mobility $\mu/\mu_0$ is then plotted against the added amount of polymer (FIG. 1, curve 1).

EXAMPLE 2

In a manner similar to that described in Example 1, $Fe_2O_3$ pigments (Bayferrox 120 FS, sold by Bayer AG) are coated under the same conditions using the same proportions and the same LCST polymers.

The $\mu/\mu_0$-reduced dynamic mobility of the coated pigment particles was determined in a manner similar to that described in Example 1. The data are depicted graphically in FIG. 1 (curve 2).

EXAMPLE 3

In a manner similar to that described in Example 1, copper(II) phthalocyanine blue pigment particles (Heliogen Blue, sold by BASF AG) are coated with the same LCST polymers using the same proportions for coating the particles.

The $\mu/\mu_0$-reduced dynamic mobility of the coated pigment particles was determined in a manner similar to that described in Example 1. The data are depicted graphically in FIG. 1 (curve 3).

From Examples 1 to 3 and the ESA readings it is clearly seen (FIG. 1) that the PEO-PPO-PEO copolymer used as LCST polymer enters into distinct interaction with both the inorganic and the organic pigments. For good interaction with the pigment particles it is of decisive importance to keep to the temperature limit (LCST).

EXAMPLE 4

In this case copper(II) phthalocyanine blue pigment particles (Heliogen Blue, sold by BASF AG) were coated by a procedure similar to that described in Example 1 with a PEO-PPO-PEO block copolymer M=4,000 g/mol; LCST ca 8° C. (Pluronics, sold by BASF AG).

Organic pigments, such as the copper(II) phthalocyanine blue used here, show, by reason of their relatively hydrophobic surface, usually only weak interaction with highly polar substances, such as binder molecules based on acrylic acid.

If, in addition, as is presently the case, the pigment and binding agent are charged with like polarity, an electrostatic repelling effect occurs, which increases with increasing charge of like polarity.

Figure 2:
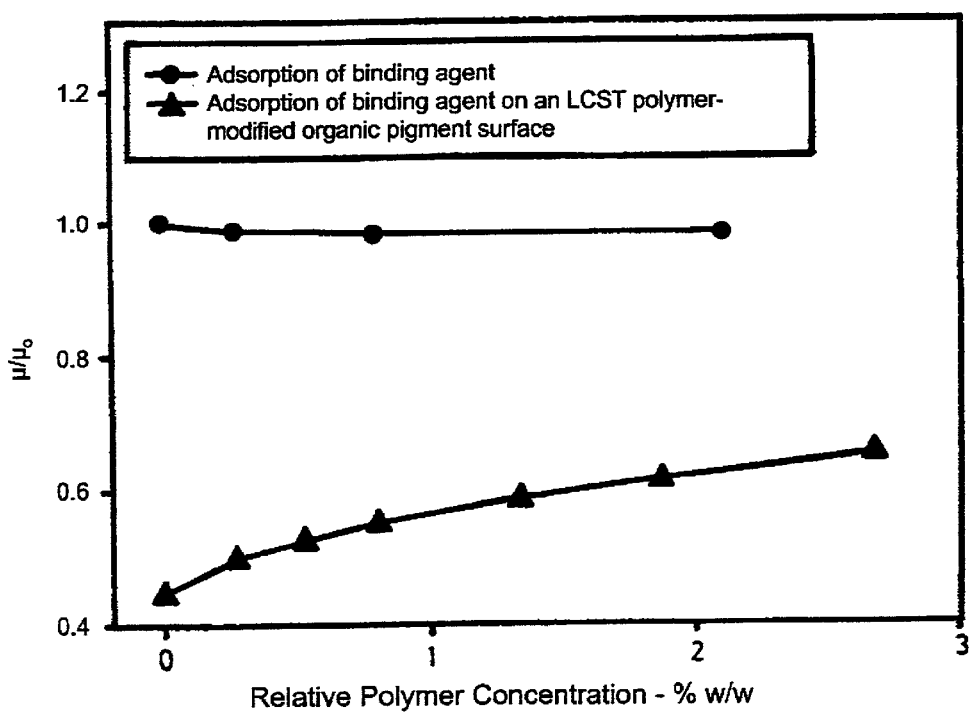
FIG. 2 illustrates compatibility improvement on copper phthalocyanine blue pigments in acrylate binding agents by means of LCST coatings of the invention.

This case is represented by the upper curve of FIG. 2. This shows that the presently used acrylate binding agent shows as negatively charged so-called polyelectrolyte no reciprocal action with the likewise strongly negatively charged pigment particle surface of the copper(II) phthalocyanine blue pigment, and the reduced dynamic mobility $\mu/\mu_0$, determined by the ESA method at 23° C. in water, remains constant.

A 1 vol % strength pigment dispersion is prepared in a manner similar to that described in Example 1. This is kept at 23° C. and adjusted to a conductance of 2,500 $\mu$S/cm and a pH of 8.5 by the use of KOH and $KNO_3$ solutions.

To determine the reciprocal action of the binding agent with the unmodified surface, a 20 wt % strength aqueous acrylate binder solution (Viacryl SC 323w/70SBB, previous name: Resydrol WY 323, Vianova Resins, Hoechst, Germany, likewise adjusted to pH 8.5) is titrated thereto and the relative mobility determined as a function of the amount of binding agent added (upper curve in FIG. 2). To determine the reciprocal action of an LCST polymer-modified pigment surface with binding agent, the 1 vol % strength pigment suspension is cooled to 2° C., 5 wt % of LCST polymer solution based on the weight of pigment (10 wt % strength of polymer solution in water) is added and, after keeping the temperature at 2° C. for 30 min, the whole is heated to 23° C. A 20 wt % strength aqueous acrylate binder solution (likewise adjusted to pH 8.5) is titrated thereto and the relative mobility is determined as a function of the amount of binding agent added (lower curve in FIG. 2).

If, however, the pigment particles are surface-modified according to the invention with an LCST polymer (here the aforementioned PEO-PPO-PEO polymer) before they are contacted by the acrylate binding agent, there is found to be a substantially stronger reciprocal action (lower curve in FIG. 2) and thus a considerably improved compatibility of the dispersed pigment particles with a medium containing binding agent, for example, an acrylic lacquer.

EXAMPLE 5

This example serves to illustrate the stabilizing action of LCST polymer coatings on $TiO_2$ pigment particles:

$TiO_2$ particles were coated in a manner similar to that described in Example 1 with a PEO-PPO-PEO block copolymer M=4000 g/mol; LCST=ca 8° C., using the same proportions and temperature conditions.

FIG. 3 shows the density values of a black reduction paste (DIN 53,235, (1977), Tests on Standard Color Depth Samples, Standard Color Depths, and Color Depth Standards) of a $TiO_2$-pigmented layer of varnish or paint, the $TiO_2$ pigment particles being used, for comparison and as commonly practised in industry, following inorganic aftertreatment (technical information: Titandioxidpigmente in Industrielacken, Kronos International, Leverkusen) and organic aftertreatment (technical information: Titandioxidpigmente in Industrielacken, Kronos International, Leverkusen). The density value found following inorganic aftertreatment was taken as being 100%.

In comparison thereto, the conventional organic secondary treatment process attained distinctly lower relative density values.

The titanium dioxide pigment treated according to the invention with LCST polymer (as in Example 4) shows a distinctly higher density value Y. This is proof of a better state of dispersion of the titanium dioxide particles or, in other words, of a reduced degree of agglomeration.

EXAMPLE 6

Like in Example 5, the color strength readings found in the present example indicate an improved state of dispersion of the pigment particles (here copper(II) phthalocyanine blue and iron oxide Bayferrox 120 FS) after being coated with LCST polymer in accordance with the present invention (in a manner similar to that described in Example 4). Particularly drastic improvements are found in the case of iron oxide pigment (cf FIG. 4). In this case, measurements of the relative coloring strength were carried out on white reduction pastes of the pigments (EN ISO 8781-1, (1995), Verfahren zur Beurteilung des Dispergierverhaltens, Part 1: Bestimmung der Farbstärkeentwicklung of Buntpigmenten; DIN EN ISO 787-24, (1995), Allgemeine Pruefverfahren für Pigmente and Füllstoffe, Part 24: Bestimmung der relativen Farbstaerke von Buntpigmenten und der relativen Steuervermögens von Weisspigmenten-Photometrische Verfahren).

EXAMPLE 7

A semiconductor wafer having a silicon dioxide surface and measuring 1×1 cm is dipped in 3 mL of distilled water. It is cooled to 2° C., and 0.2 mL of a 10 wt % strength LCST polymer solution (eg , PEO-PPO-PEO block copolymer, molar mass ca 4000, LCST ca 8° C.) are added. Following a period of 2 hours at 2° C., it is heated to 23° C. within an hour. It is then recooled to 2° C., but only for the duration of 10 min, after which it is heated to 23° C. within an hour. This cycle of cooling and heating is carried out three times in all. After the final cycle, the wafer remains in the liquid coating medium for a further 24 hours at 23° C. and is afterwards rinsed with distilled water.

EXAMPLE 8

Preparation of a Pigment Paste 44 g of carbon black, 300 mL of distilled water and 250 mL of zirconia beads are placed in a thermostatically controlled dispersing vessel, where they are kept at 2° C. and dispersed by stirring at 4000 rpm with a high-speed stirrer. After a period of 15 min, 60 mL of a 10 wt % strength LCST polymer solution (solution of a PEO-PPO-PEO block copolymer, molecular weight ca 4000 g/mol, LCST ca 8° C.) and also 100 mL of distilled water are added, and the speed of the stirrer is reduced to 2000 rpm. Following a dispersing period of one hour at 2° C., the dispersion is heated to 23° C., dispersed for 15 min at room temperature, and again cooled to 2° C. After a dispersing period of 15 min at 2° C., a further 60 mL of 10 wt % strength of LCST polymer solution are added, and the mixture is heated to 23° C. and again dispersed for 15 min at 23° C. The beads are sifted off and water is removed by distillation in vacuo at 45° C. until the solids content of the paste is ca 20 wt %. The pigment paste thus produced shows good stability to flocculation and exhibits good compatability with different binder systems.

We claim:

1. Particles having a coating based on a deposited and immobilized LCST polymer.

2. The particles of claim 1, wherein the particles are pigment particles.

3. A binder-free pigment paste comprising one or more pigments as defined in claim 2 and a liquid vehicle.

4. A pigment paste as defined in claim 3, wherein the liquid vehicle comprises water and/or an organic solvent.

5. A non-particulate substrate having a coating comprising a deposited and immobilized LCST polymer.

6. A method of coating particles with LCST polymers, comprising the following steps:

a) dissolving an LCST polymer in a solvent at a temperature below the LCST;

b) mixing the solution obtained in step a) with the particles to be coated;

c) increasing the temperature of the mixture obtained in step b) to or beyond the point at which said LCST polymer deposits onto the particle surfaces; and d) immobilizing the deposited LCST polymer.

7. A method as defined in claim 6, wherein the particles are substantially completely enveloped by an LCST polymer.

8. A method as defined in claim 6, wherein the layer thickness of the LCST polymer coating or sheath is $\geq 20$ nm.

9. A method as defined in claim 8, wherein the layer thickness of the LCST polymer coating or sheath is $\geq 25$ nm.

10. A method as defined in claim 6, wherein the LCST polymer is provided with functional groups which permit substantially irreversible adsorption onto the surface of the particles.

11. A method as defined in claim 10, wherein the functional groups are selected from the group comprising acid groups, hydroxyl groups, amino groups, phosphate groups, mercaptan groups, silicon compounds, or hydrophobic groups.

12. A method as defined in claim 6, wherein the LCST polymer is provided with functional groups which can create an ionic or chemical bond to the particles.

13. A method as defined in claim 6, wherein the functional groups are selected from the group comprising carboxylic derivatives, chloroformate groups, amino groups, isocyanate groups, oxirane groups, and/or radically crosslinkable groups.

14. A method as defined in claim 6, wherein the LCST polymer is provided with functional groups which after deposition of the LCST polymers onto the particles permit crosslinking of the LCST polymers in a crosslinking reaction.

15. A method as defined in claim 14, wherein the functional groups are selected such that the crosslinking reaction can be initiated by changing the pH of the solution.

16. A method as defined in claim 14, wherein the functional groups are selected from the group comprising carboxylic derivatives, chloroformate groups, amino groups, isocyanate groups, oxirane groups, and/or radically crosslinkable groups.

17. A method as defined in claim 6, wherein the LCST polymer is selected such that its LCST is below the operating temperature.

18. A method as defined in claim 17, wherein the LCST polymer is selected such that its LCST is below the operating temperature and is at least 10° C. or more below room temperature.

19. A method as defined in claim 18, wherein the LCST polymer is selected such that its LCST is below the operating temperature and is at least 15° C. or more below room temperature.

20. A method as defined in claim 6, wherein the particles used are pigment particles, filler particles, nanoparticles having an average particle diameter of <100 nm, or fibers, including microfibers.

21. A method as defined in claim 20, wherein the fibers are selected from the group comprising glass fibers, carbon fibers, textile fibers, metal fibers, or polymer fibers.

22. A method as defined in claim 6, wherein the particles are granular, lamellar, needle-shaped, or irregularly shaped.

23. A method of stabilizing dispersions of particles in liquid media wherein the particles are coated with an LCST polymer by a method as defined in claim 6.

24. A method of coating non-particulate substrate surfaces with LCST polymer, characterized by the following steps:
   a) dissolving an LCST polymer in a solvent at a temperature below the LCST;
   b) contacting the solution obtained in step a) with the non-particulate substrate surface to be coated;
   c) raising the temperature to or beyond the point at which deposition of LCST polymer onto the substrate surface takes place; and
   d) immobilizing the deposited LCST polymer.

25. A method as defined in claim 24, wherein the LCST polymer is provided with functional groups which permit substantially irreversible adsorption onto the surface of the non-particulate substrate.

26. A method as defined in claim 25, wherein the functional groups are selected from the group comprising acid groups, hydroxyl groups, amino groups, phosphate groups, mercaptan groups, silicon compounds, or hydrophobic groups.

27. A method as defined in claim 24, wherein the LCST polymer is provided with functional groups which permit the formation of an ionic or chemical bond to the non-particulate substrate surface.

28. A method as defined in claim 27, wherein the functional groups are selected from the group comprising carboxylic derivatives, chloroformate groups, amino groups, isocyanate groups, oxirane groups, and/or radically crosslinkable groups.

29. A method as defined in claim 24, wherein the LCST polymer is provided with functional groups which following deposition of the LCST polymer on the substrate surface permit crosslinking of the LCST polymers in a crosslinking reaction.

30. A method as defined in claim 29, wherein the functional groups are selected such that the crosslinking reaction can be initiated by changing the pH of the solution.

31. A method as defined in claim 29, wherein the functional groups are selected from the group comprising carboxylic derivatives, chloroformate groups, amino groups, isocyanate groups, oxirane groups, and/or radically crosslinkable groups.

32. A method as defined in claim 24, wherein the LCST polymer is selected such that its LCST temperature is below the operating temperature of said surface-treated non-particulate substrate.

33. A method as defined in claim 24, wherein the non-particulate substrate is selected from the group comprising paper, leather, textiles, panes of glass, stone, ceramics, metal, or plastics material.

34. A method as defined in claim 24, wherein the substrate used is a semiconductor wafer.

35. A method of producing masks on surfaces of semiconductor wafers, characterized by the steps for the deposition of an LCST polymer as defined in claim 24.

* * * * *

UNITED STATES PATENT AND TRADEMARK OFFICE
CERTIFICATE OF CORRECTION

PATENT NO. : 6,686,046 B2
DATED : February 3, 2004
INVENTOR(S) : Schauer et al.

It is certified that error appears in the above-identified patent and that said Letters Patent is hereby corrected as shown below:

Column 9,
Line 7, "A method as defined in claim 6" should read -- A method as defined in claim 12 --.

Signed and Sealed this

Fifteenth Day of February, 2005

JON W. DUDAS
*Director of the United States Patent and Trademark Office*